Feb. 28, 1967
C. E. HOOPER
3,306,162
LENS TESTING APPARATUS HAVING A PAIR
OF MUTUALLY PERPENDICULAR HAIRLINES
Filed March 31, 1966
4 Sheets-Sheet 1
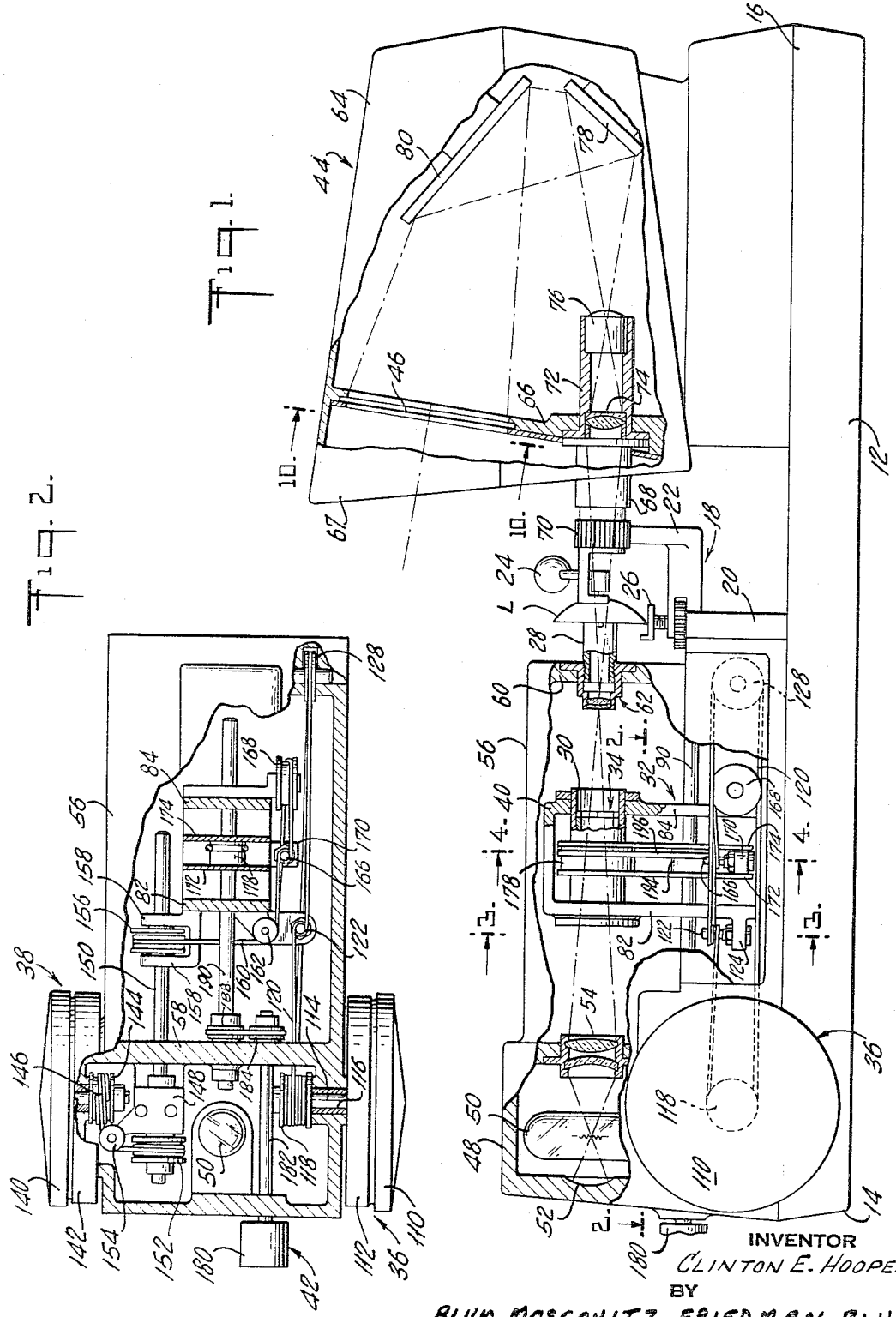
INVENTOR
*CLINTON E. HOOPER*
BY
BLUM, MOSCOVITZ, FRIEDMAN, BLUM
AND KAPLAN
ATTORNEY

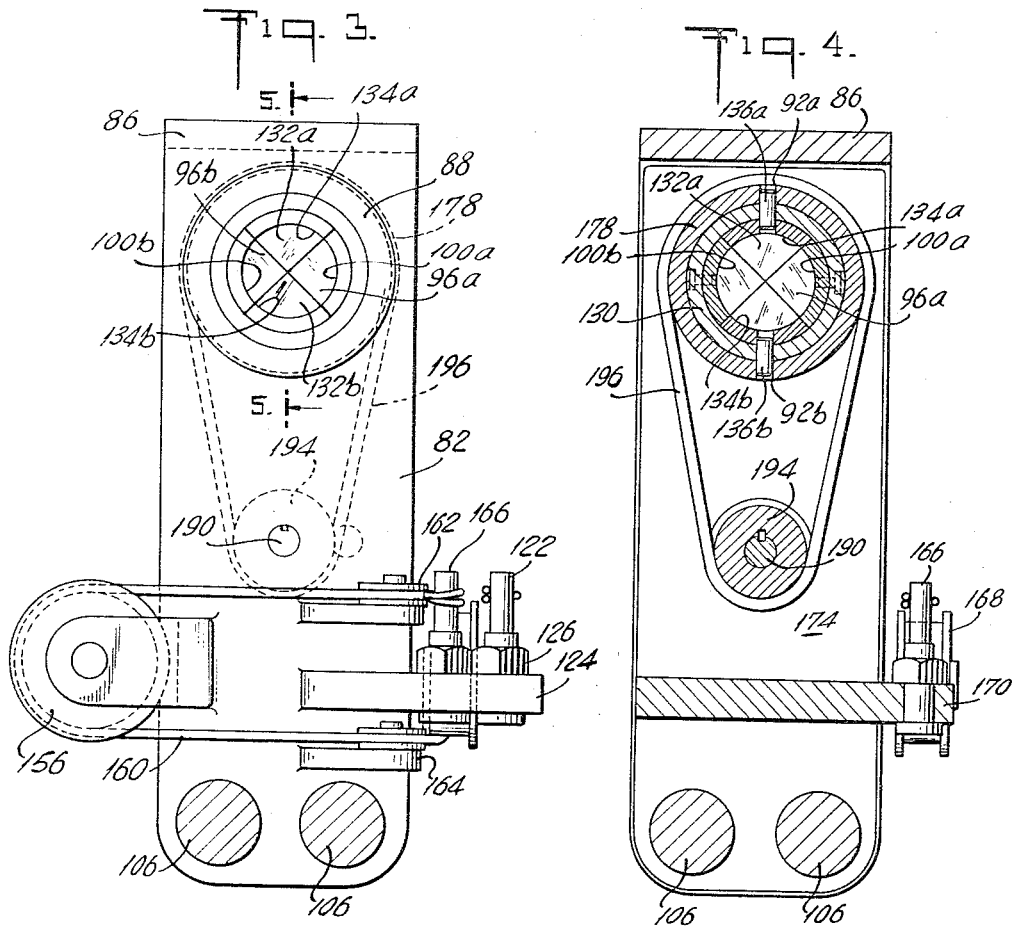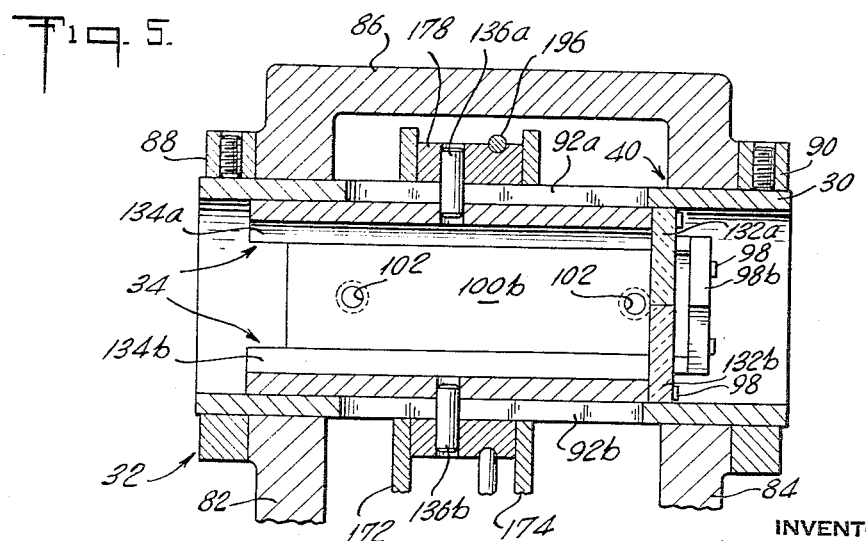

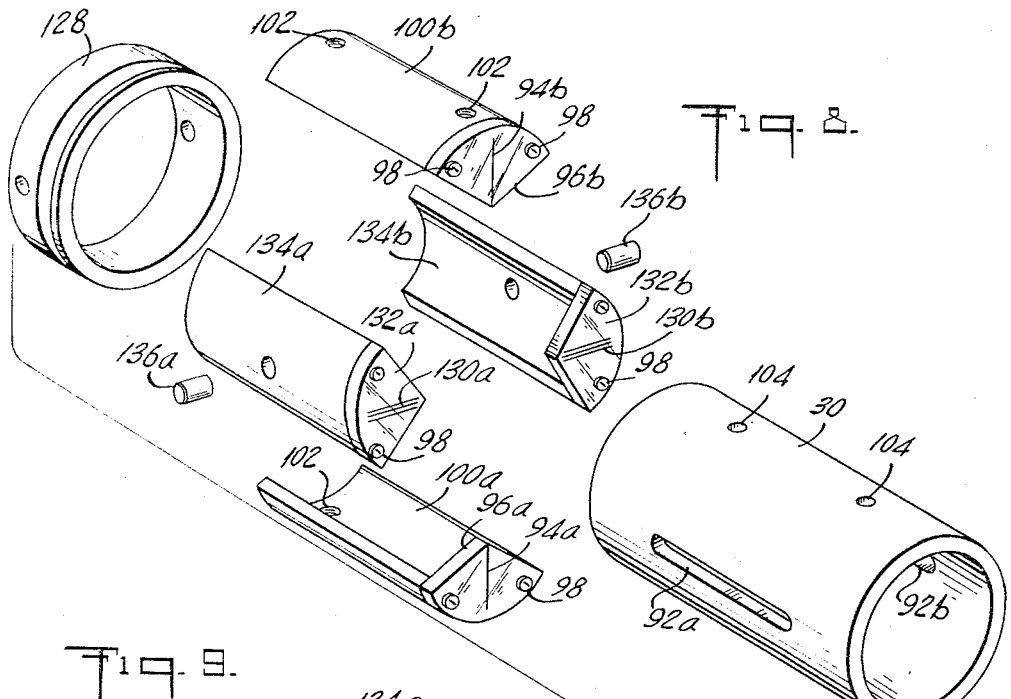
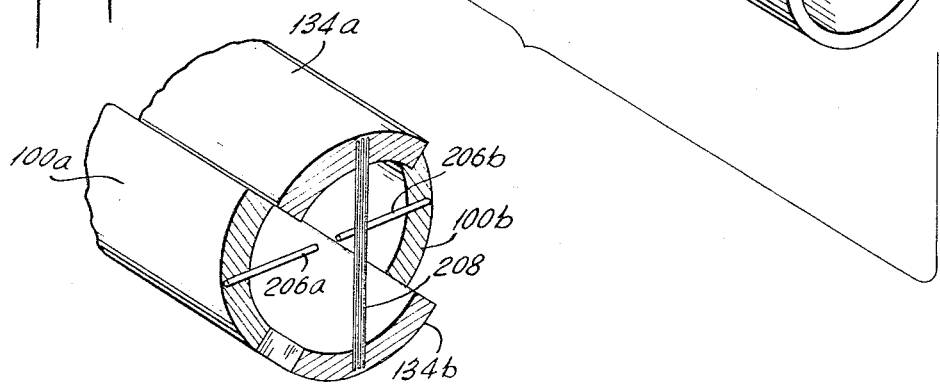
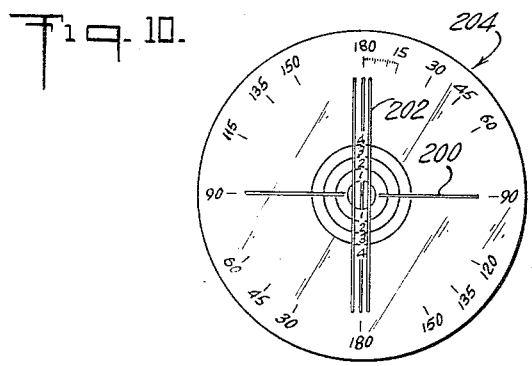

United States Patent Office 3,306,162
Patented Feb. 28, 1967

3,306,162
LENS TESTING APPARATUS HAVING A PAIR OF MUTUALLY PERPENDICULAR HAIRLINES
Clinton E. Hooper, Brookfield, Conn., assignor to A. Lemay Optical Corp., Carmel, N.Y., a corporation of New York
Filed Mar. 31, 1966, Ser. No. 539,082
8 Claims. (Cl. 88—56)

The present invention relates to lens testing apparatus.

The invention relates in particular to that type of lens testing apparatus in which the lens to be tested is situated in an optical system of the apparatus. This optical system can be adjusted to provide sharp images of a pair of mutually perpendicular hairlines so as to give values of the lens in mutually perpendicular meridians. In addition, such an apparatus usually is provided with structure for rotating the pair of hairlines while maintaining them perpendicular to each other, to take care of the situation where the particular lens which is tested has an astigmatic value. Thus, in apparatus of this type there will be a generally horizontal hairline which when adjusted to provide a sharp image will give an indication of the spherical power of the lens, and the other hairline is generally vertical. Adjustment of the apparatus to provide a sharp image of the vertical hairline gives an indication of the cylindrical power of the lens.

While apparatus of the above general type is known, the conventional apparatus is highly complex and expensive as well as inconvenient to use and possessed of inherent inaccuracies which are difficult to eliminate. Thus, it is conventional to provide the images by way of a telescope or the like which must be situated at the front of the apparatus so as to be convenient to the eye of the operator who is situated adjacent the front of the apparatus. As a result the adjustable, mutually perpendicular hairlines are generally situated toward the rear of the apparatus with the resulting inconvenience that the operator either must reach toward the rear of the apparatus in order to make the adjustments, or if the adjusting structure is accessible at the front of the apparatus, then exceedingly long and complex transmissions are required to transmit the manipulations of the operator to the rear of the apparatus where the adjustable hairlines are situated.

In addition, there is unavoidable play in the movable components and backlash in the transmission which result in inherent inaccuracies which are difficult to eliminate from the conventional apparatus.

It is accordingly a primary object of the present invention to provide a lens testing apparatus of the above general type which will, however, avoid the above drawbacks of the conventional apparatus.

In particular, it is an object of the invention to provide a lens testing apparatus in which the various components are arranged with respect to each other in such a way that while the aparatus is exceedingly convenient to manipulate by the operator so as to carry out the required adjustments, nevertheless the apparatus is still of an exceedingly simple construction which is relatively inexpensive and at the same time highly accurate.

In general, the structure of the invention includes a base means which has a front end adapted to be situated adjacent the operator and a rear end distant from the front end. In between its front and rear ends the base means carries a lens-carrier means on which the lens to be tested is mounted. A pair of mutually perpendicular hairline means are situated over the base means forwardly of the lens carrier means, and each hairline means is situated in a plane which is normal to the optical axis of the lens which is to be tested. In addition, both of the hairline means extend up to the immediate vicinity of the latter axis. A pair of support means are carried by the base means forwardly of the lens-carrier means and respectively support the pair of hairline means for movement along the optical axis, and a third support means is provided to support the pair of hairline means for turning in unison about the optical axis. A pair of manually operable adjusting means are situated in the region of the front end of the base means, so as to be readily accessible to the operator, and this pair of adjusting means are respectively connected with the above-mentioned pair of support means to adjust the latter so as to be capable of respectively shifting the pair of hairline means along the optical axis, and a third manually operable adjusting means is also situated in the region of the front end of the base means and is operatively connected with the third support means for angularly turning the pair of hairline means while maintaining them in their mutually perpendicular relationship. Finally, an image-forming means is carried by the base means rearwardly of the lens-carrier means to provide images of the hairlines, and when, in response to manipulation of the adjusting means, sharp images of the hairlines are seen at the image-forming means perpendicularly intersecting each other, the operator will be able to determine from suitable scales such information as the spherical and cylindrical powers of the lens as well as an astigmatic value, if any.

The invention is illustrated by way of example in the accompanying drawings which form part of the application and in which:

FIG. 1 is a schematic, partly broken away and partly sectional side elevation showing one possible embodiment of a structure which incorporates the features of the present invention;

FIG. 2 is a partly sectional plan view taken along line 2—2 of FIG. 1 in the direction of the arrows;

FIG. 3 is a transverse section, on an enlarged scale as compared to FIG. 1, taken along line 3—3 of FIG. 1 in the direction of the arrows, and showing part of the support means and adjusting structure;

FIG. 4 is a transverse section taken rearwardly of FIG. 3 along line 4—4 of FIG. 1 in the direction of the arrows and showing further details of the supporting and adjusting structure;

FIG. 5 is a longitudinal sectional elevation taken along line 5—5 of FIG. 3 in the direction of the arrows, and showing the details of the structure which carries and adjusts the hairlines;

FIG. 8 is an exploded perspective view of the support means for supporting the pair of mutually perpendicular hairlines;

FIG. 9 is a fragmentary exploded perspective illustration of another embodiment of hairlines and a support means therefor; and FIG. 10 is a view taken along line 10—10 of FIG. 1 in the direction of the arrows and showing scales which are carried by a viewing screen of the apparatus.

General arrangement

Figure 6:
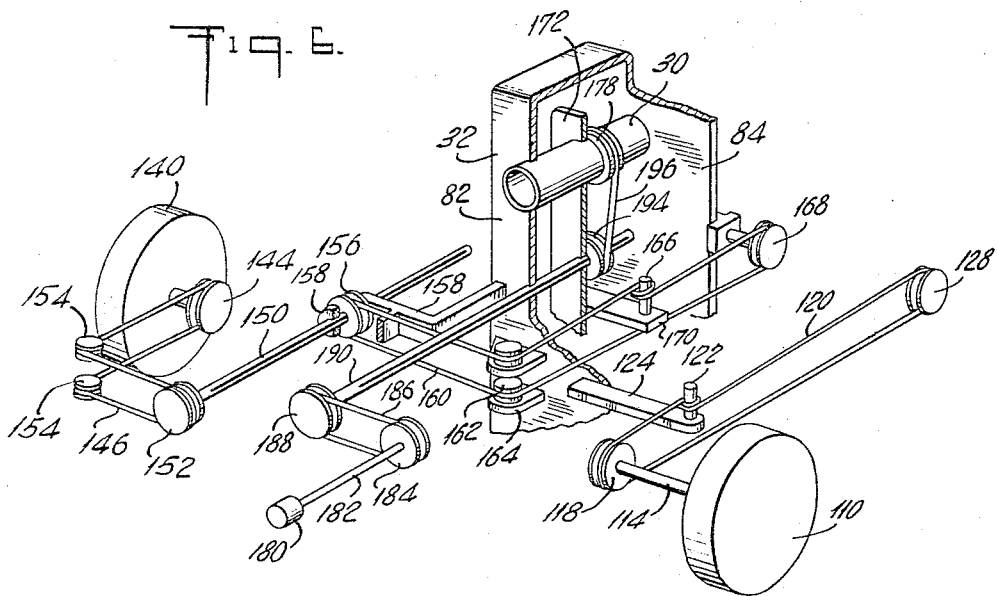
FIG. 6 is a fragmentary perspective schematic illustration of the transmissions which form the adjusting means of the invention.

Referring to FIG. 1, the lens testing apparatus illustrated therein includes an elongated base means 12 having a front end 14 and a rear end 16. The operator is situated adjacent front end 14 of the apparatus with the rear end 16 distant from the operator.

In between its ends, the base means 12 supports a lens-carrier means 18 on which the lens L which is to be tested is adapted to be mounted. This lens-carrier means 18 is fixed to the structure 20 extending upwardly from the base means 12 and includes a stationary bracket 22 which carries a conventional manually operable gripping assembly 24 capable of being operated to grip and release the lens L. In addition the lens-carrier means 18 has a lens-supporting table 26 which is adjustable in elevation. In its gripped position the lens L is pressed against the rear end of a tube 28 of the optical system which is described in greater detail below. The details of the lens-carrier means 18 are not critical to the present invention and can vary considerably without departing from the invention, and inasmuch as the lens-carrier means 18 can be conventional in its details, it is not described further.

A pair of mutually perpendicular hairline means, described in greater detail below, are situated within an elongated, hollow, open-ended sleeve 30 which forms part of a support means 32 which supports one of the pair of hairlines for movement along the optical axis of the lens L. A second support means 34 is provided for the other of the hairlines so as to move this other hairline also along the optical axis, and both of these support means are carried by the base means 12 forwardly of the lens-carrier means 18 in the manner described below in greater detail below.

A manually operable adjusting means 36 is operatively connected with the support means 32 for adjusting the position of the latter along the optical axis, and a second manually operable adjusting means 38 (FIG. 2) is operatively connected with the support means 34 for adjusting the position of the latter along the optical axis, so that in this way the positions of both the hairlines along the optical axis can be adjusted. In addition, a third support means 40 supports the pair of hairline means for angular turning, in unison, about the optical axis, and a third manually operable adjusting means 42 (FIG. 2) is operatively connected with the third support means 40 for the purpose of angularly turning the pair of hairlines.

The base means 12 carries rearwardly of the lens-carrier means 18, an image-forming means 44 which will provide, in response to manipulation of the pair of manually operable adjusting means 36 and 38, sharp images of the the pair of hairlines perpendicularly intersecting each other and visible to the operator.

*Optical system*

The optical system which constitutes the image-forming means 44 is a projection system for projecting onto the screen 46 images of the hairlines which are situated withing the sleeve 30, as pointed out above. This optical system includes at the front end 14 of the base means 12 a lamp housing 48 within which is located a lamp 50 adapted to be placed in communication with any source of electrical energy so as to be capable of being energized at the option of the operator. The housing 48 includes a reflector 52 as well as a condensing lens unit 54, so that light from the lamp 50 will be directed in the form of a beam along the optical axis through the sleeve 30 along the axis thereof. Within the sleeve 30 are situated the hairlines which thus will have their images projected in a manner described below.

The lamp housing 48 constitutes the forward section of an elongated housing 56 in which the support means and adjusting means are situated, and this housing 56 has a transverse wall 58 which carries the condensing lens unit 54 and which separates the lens housing from the rear portion of the housing 56 which accommodates the pair of support means and adjusting means. The housing 56 terminates in a rear end wall 60 which carries the tube 28 against whose open rear end the lens L is pressed by the lens-carrier means 18, as pointed out above. Forwardly of the tube 28, the rear wall 60 carries a front objective 62 of the optical system.

Situated to the rear of the lens-carrier means 18 is the housing 64 having an open front end 67 through which the screen 46 is clearly visible to the operator at the front of the apparatus. The housing 64 is mounted in any suitable way on the base means 12 to the rear of the lens-carrier means 18. The front wall 66 of the housing 64, which carries the screen 46 in a suitable aperture of this front wall, also carries a forwardly extending open-ended tube 68 received in a ring 70 carried by the bracket 22. This tube 68 forms part of a tubular assembly 72 which carries the rear objective 74 and the projecting lens unit 76.

This optical structure will project an image onto the lower direction-changing mirror 78 carried by a suitable mount in the interior of the housing 64 and serving to direct the image upwardly to an upper direction-changing mirror 80 which is also carried by a suitable mount within the housing 64. The pair of mirrors 78 and 80 cooperate to transmit the image to the screen 46 where it will be visible to the operator.

*Spherical power system*

Referring now to FIG. 5, the support means 32 is in the form of an open cage or frame of substantially U-shaped configuration having a front wall 82 and a rear wall 84 interconnected by a top wall 86. The front and rear walls 82 and 84 are formed with coaxial circular openings in which the sleeve 30 is supported for rotary movement, so that in this way the portions of the walls 82 and 84 which support the sleeve 30 as well as the sleeve 30 itself form the support means 40 which supports the pair of hairline means for angular movement about the optical axis.

The sleeve 30 is of a simple cylindrical configuration and has opposed open ends. It fixedly carries a front collar 88 and a rear collar 90 so that while the sleeve 30 is freely turnable in the support means 32, it cannot move axially with respect thereto. The sleeve 30 is formed with a pair of diametrically opposed longitudinally extending slots 92a and 92b, and these slots will generally be located at the upper and lower parts of the sleeve 30, as indicated in FIG. 5. The slot 92a is shown in FIG. 8 positioned laterally solely for the sake of convenience, since in this attitude more of the details of the structure are visible in FIG. 8.

Referring to FIG. 8, the hairline means which forms the hairline for the spherical power is constituted by a pair of lines 94a and 94b. These lines 94a and 94b of course extend in a generally horizontal direction but are shown in a vertical position in FIG. 8 only for the sake of convenience. They extend along a common straight line and are respectively carried by a pair of transparent sector-shaped plates 96a and 96b which form segments of a circle. These transparent plates 96a and 96b may be made of glass, for example, and each plate includes at its central apex portion an angle of approximately 90°. The plates 96a and 96b have the hairlines 94a and 94b situated thereon as by being printed thereon, etched thereon, or placed on the transparent plates in any suitable way. The plates 96a and 96b are fixed, as by screws 98, to the rear ends of a pair of elongated cylinder sections 100a and 100b, respectively. These cylinder sections together with the glass plates form support members which carry the hairline means 94a, 94b. The longitudinal cylinder sections 100a and 100b, which form part of a common cylinder, are formed with threaded openings 102 adapted to be aligned with threaded openings 104 of the sleeve 30, so that suitable screws may extend through the alinged pairs of openings 102 and 104 in order to fix the members 100a and 100b to the inner surface of the sleeve 30, and these fastening screws do not extend beyond the exterior surface of the sleeve 30. FIG. 5 shows the cylinder segment 100b fixed within the sleeve 30 and carrying at its rear end the transparent segment 96b which is fastened by the screws 98 to the rear end of the cylinder section 100b.

It is apparent, therefore, that the generally horizontal hairline means used for determining the spherical power of the lens L is fixedly mounted within the sleeve 30 which in turn is carried by the support means 32 for movement along the optical axis.

The walls 58 and 60 of the housing 56 serve to fixedly mount a pair of guide rods 106 (FIG. 3) which are of circular cross section and which extend parallel to the optical axis, and these guide rods extend through openings 108 of the walls 82 and 84 (FIG. 7) so that in this way the support means 32 is mounted on the base means 12 for movement along the optical axis.

The manually operable adjusting means 36 is manipulated to adjust the position of the support means 32, and thus of the hairline means 94a, 94b along the optical axis, and this manually operable adjusting means 36 includes a manually turnable knob 110 accessible to the operator at the right front portion of the base means 12. The knob 110 has a cylindrical portion 112 which may be provided with a conventional scale for indicating spherical power, and this scale which is not illustrated can cooperate with any suitable stationary index carried by the housing 56 adjacent to the scale on the cylindrical portion 112.

The knob 110 is fixed to a rotary shaft 114 (FIGS. 2 and 6) which is supported for rotary movement in a suitable bearing 116 carried by the housing 56, and at its inner end the shaft 114 carries a drum 118 on which a belt 120 is wound. The drum 118 is constrained to rotate with the shaft 114 and the knob 110. From the drum 118 the belt 120 passes through a suitable opening of the wall 58 to a pin 122. This vertical pin 122 has a lower threaded portion extending into an opening of a lug 124 which is fixed to and projects horizontally from the front wall 82. The pin 122 has a lower head end engaging the lower surface of the lug 24, and its threaded portion carries a nut 126 so that the pin 122 can be fixed in a given angular position on the lug 124. The belt 120 is in the form of an elongated flexible member which is substantially non-stretchable and which can be maintained taut so as to provide a very accurate transmission of motion without any problems of play, backlash or the like. By winding the belt 120 around the pin 122 it is possible to adjust the tension of the belt 120 as well as to fix it to the support means 32 for displacing the latter along the rods 106.

From the pin 122 the belt 120 passes around a pulley 128 mounted for rotary movement in a suitable opening of the rear wall 60 of the housing 56 and carried by a suitable shaft. The belt 120 after passing around the rear pulley 128 returns through the opening of the wall 58 to the drum 118. Thus, angular movement of the drum will result in displacement of the support means 32 and all of the structure carried thereby along the optical axis.

During operation of the apparatus, the operator, after positioning the lens L on the lens-carrier means 18, will turn the knob 110 until he sees at the screen 46 a sharp image of the hairline means 94a, 94b and then by consulting the scale on the cylindrical portion 112 of the knob 110 the operator will know the spherical power of the lens.

*Cylindrical power system*

The cylindrical power system includes the hairline means 130a, 130b in the form of a pair of sets of hairlines 130a and 130b respectively imprinted or otherwise situated on the rear surfaces of the sector-shaped transparent segments 132a and 132b, as shown most clearly in FIG. 8. These segments may be identical with the segments 96a and 96b and are fixed in the same way to the rear ends of longitudinal cylinder sections 134a and 134b. It is again pointed out that while these elements are shown situated laterally in FIG. 8, this is only for convenience and actually the cylinder section 134a is situated over the cylinder section 134b, as indicated in FIG. 5. These cylinder sections together with the transparent segments 132a and 132b form support members which carry the hairline means 130a, 130b which in the illustrated example take the form of sets of three closely spaced parallel lines so as to distinguish them from the hairline means 94a, 94b. Coaxial pins 136a and 136b are pressed into openings of the cylinder sections 134a and 134b, respectively, and extend through the slots 92a and 92b in the manner shown most clearly in FIG. 5. All of the cylinder sections 100a, 100b, 134a, 134b, form sections of a common cylinder whose exterior surface is the same as the interior surface of the sleeve 30, so that the sleeve 30 guides the cylinder sections 134a and 134b for longitudinal movement. In addition, it will be seen that the members 100a and 100b define between themselves a space in which the members 134a and 134b are accommodated for longitudinal sliding movement, and the side edges of the members 134a and 134b are in slidable engagement with the side edges of the members 100a and 100b. The segments 132a and 132b are freely movable through and beyond the space defined between the segments 96a and 96b, so that with the structure of the invention it is not only possible to situate the hairline means 130a, 130b in plane coinciding with that in which the hairline means 94a, 94b is located, but in addition it is possible to displace the hairline means 130a, 130b past the hairline means 94a, 94b to locations situated forwardly or rearwardly of the hairline means 94a and 94b.

The manually operable adjusting means 38 is operatively connected with the support means 34 for adjusting the latter. This manually operable adjusting means 38 includes the knob 140 which is accessible to the operator at the lower left side of the testing apparatus and which is fixed with a cylindrical portion 142 (FIG. 2) adapted to carry a suitable scale cooperating with a stationary index so as to indicate the cylindrical power of the lens L. The knob 140 is fixed to a shaft turnably mounted in a suitable bearing carried by the side wall of the housing 56, and within the housing the shaft carries the drum 144 on which the belt 146 is wound. This structure is also indicated schematically in FIG. 6. The wall 58 supports within the lamp housing 48 a bracket 148 which through suitable bearing structure supports for rotary movement a shaft 150 which cannot move axially. This shaft 150 carries at its front end, within the lamp housing 48, a pulley 152 around which the belt 146 passes, and the bracket 148 also supports for rotary movement upper and lower pulleys 154 around which the belt 146 passes. Therefore, in response to rotation of the knob 140, the shaft 150 will be turned.

The shaft 150 passes through a suitable opening of the wall 58 to the rear of the latter, and a pulley 156 is slidably keyed on the shaft 150 to the rear of the wall 58. Thus, while the pulley 156 is free to move axially along the shaft 150 it is constrained to rotate therewith. The pulley 156 is situated between a pair of ears 158 which are fixed to the front wall 82 of the cage or frame 32 in the manner shown in FIGS. 6 and 7.

A belt 160 extends around the pulley 156 and around a pair of freely rotatable pulleys 162 which are supported for rotary movement by suitable shafts carried by lugs 164 which are fixed to and project forwardly from the front wall 82 of the support means 32. The belt 160 also extends around a belt-tensioning pin 166 and around a rear pulley 168 mounted for rotation on a shaft carried by the rear wall 84 of the support means 32. Thus, the upper run of the belt 160 extends from the pulley 156 around the upper pulley 162 and then extends around the pin 166 to have its tension adjusted after which the belt extends around the pulley 168 and back around the lower pulley 162 to return to the pulley 156.

The pin 166 is carried by a member 170 in the same way that the pin 122 is carried by the lug 124. This member 170 is situated between and fixed to a pair of vertical walls 172 and 174 of a sub-frame which is situated between the walls 82 and 84. As is apparent from FIG. 4 this sub-frame is also supported for movement on the rods 106.

Figure 7:
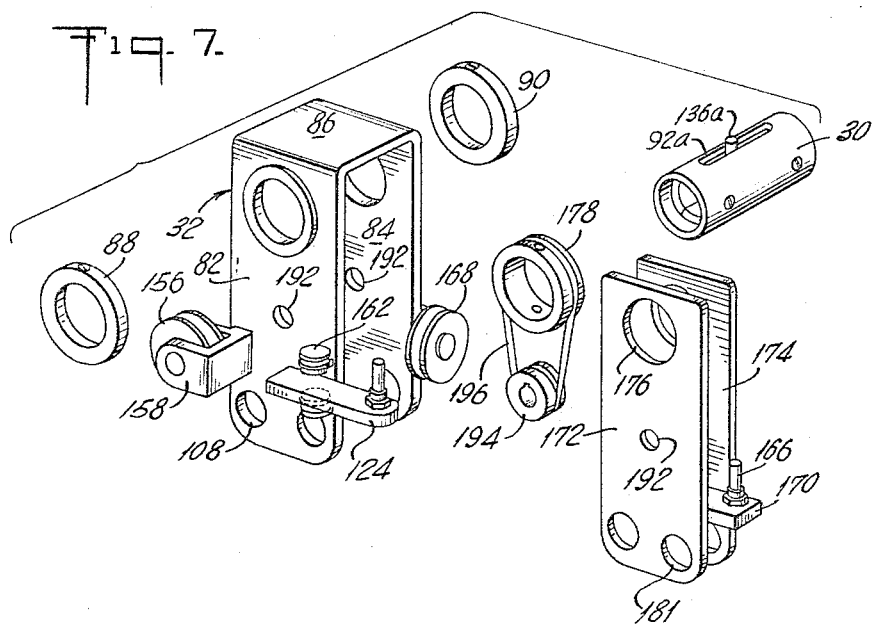
FIG. 7 is an exploded perspective illustration of the supporting and adjusting structure for the hairlines.

The walls 172 and 174 are respectively formed with openings 176 through which the sleeve 30 freely extends, and surrounding the sleeve 30 is a ring 178 (FIG. 5) which is situated between the walls 172 and 174 so as to be constrained to move axially therewith. This sleeve 178 is freely shiftable along the sleeve 30 and is formed with opposed bores into which the pins 136a and 136b are respectively pressed, so that in response to shifting of the sub-frame along the rods 160 the hairline means 130a, 130b will be displaced along the optical axis of the lens L. FIG. 7 shows the openings 181 of the walls 172 and 174 through which the rods 160 slidably extend.

Since the pin 166 fixes the belt 160 to the sub-frame 172, 174, it is clear that this sub-frame will axially move in response to rotation of the shaft 150, so that when the operator turns the knob 140 the hairline means for the cylindrical power will be adjusted.

Axis rotation system

As was indicated above, the support means 40 supports the pair of hairline means for rotation in unison about the optical axis, and this support means 40 is formed by those portions of the front and rear walls 82 and 84 of the support means 32 which support the sleeve 30 for rotary movement as well as the sleeve 30 itself.

A third manually operable adjusting means 42 is operatively connected with the sleeve 30 for rotating the latter, and this third manually operable adjusting means 42 includes a knob 180 accessible to the operator at the front of the apparatus. As is shown in FIGS. 2 and 6, the knob 180 is fixed to a rotary shaft 182 which extends parallel to the optical axis and is supported for rotary movement in suitable bearings of the front and rear walls of the lamp housing 48. This shaft extends to the rear of the wall 58 wherein it fixedly carries a pulley 184 around which a belt 186 passes, and this belt passes in turn around a second pulley 188 fixedly carried by a rotary shaft 190 which is supported for rotary movement by a suitable bearing structure carried by the wall 58. The shaft 190 passes freely and slidably through aligned openings 192 which are respectively formed in the successive parallel vertical walls 82, 172, 174 and 84. A pulley 194 is slidably keyed on the shaft 190 so as to be axially movable with respect thereto while being constrained to rotate therewith. An endless belt 196 extends around the pulley 194 and around the ring 178 which also acts as a pulley. The ring 178 and the pulley 194 are situated between and engage the walls 172 and 174 so that the ring 178 and the pulley 194 are constrained to move axially with the walls 172 and 174.

Thus, when the operator turns the knob 180, motion will be transmitted by the belt-and-pulley transmission described above to the ring 178 which, by engagement with the pins 136a and 136b, will turn the sleeve 30 for the purpose of angularly adjusting the pair of hairline means in unison.

Operation

In order to use the apparatus the operator will first position a lens L on the lens-carrier means 18. Then the operator will turn the knob 110 which will result in displacement of both of the support means 32 and 34 along the optical axis. The rotation of the knob 110 will result in movement of the belt 120 which by its connection with the pin 122 will displace the entire frame 32 with all of the structure carried thereby. At this time the ears 158 which are fixed to the frame 132 will axially move the pulley 156 along the shaft 150. The entire pulley system 162, 168, will shift with the support means 32, together with the belt 160 and the sub-frame formed by the walls 172 and 174. The pulley 194 together with the belt 196 and the ring 178 will thus move with the support means 32 without changing its position relative thereto, and at this time the pulley 194 will simply slide axially along the shaft 190.

The operator will continue this adjustment until an image 200 (FIG. 10) of the spherical hairline means 94a, 94b is visible on the screen 46.

When this latter image is sharply defined on the screen, the operator will carry out the cylindrical power determination by turning the knob 140 which will result in movement of the belt 160. By its connection to the pin 166 the sub-frame 172, 174 will be axially moved, so that the ring 178 will now slide along the sleeve 30 while the pulley 194 slides along the shaft 190. The sleeve 30, however, will not move at this time so that the spherical hairline means remains in its focused position, and the operator continues this adjustment until he sees a sharp image 202 (FIG. 10) of the cylindrical hairline means 130a, 130b on the screen 46.

As is indicated in FIG. 10, the screen 46 carries a scale 204 of angular adjustment with respect to the axis of the lens which is to be tested, and where an astigmatism value is required the operator will turn the knob 180 so as to turn the shaft 190 and thus act through the ring 178 on the sleeve 30 to turn the latter and angularly position the images 200 and 202 with respect to the scale 204, so as to obtain an astigmatic value.

Embodiment of FIG. 9

Instead of taking the form of lines carried by transparent sector-shaped plates, it is possible to form the pair of hairline means as shown in FIG. 9. Thus, the generally horizontal hairline means can take the form of a pair of coaxial pins 206a and 206b respectively fixedly carried by the cylinder sections 100a and 100b and terminating in free ends which are adjacent but spaced from the optical axis. The cylindrical hairline means takes the form of three filamntary elements 202 in the form of wires stretched between and fixed to the cylinder sections 134a and 134b. The spacing between the inner free ends of the pins 206a and 206b is sufficiently great to permit the hairline means 208 to pass freely therethrough.

Otherwise, the embodiment of FIG. 9 is identical with that described above.

It is apparent that the embodiment of FIG. 9 will provide on the screen 46 the same images 200 and 202 which are formed by the embodiment of FIG. 8.

What is claimed is:

1. In a lens testing apparatus, base means having front and rear ends and adapted to be situated with its front end adjacent the operator of the lens testing apparatus, lens-carrier means mounted on said base means between said ends thereof for carrying a lens to be tested, a pair of mutually perpendicular hairline means for respectively measuring the spherical and cylindrical powers of said lens, both extending to the immediate vicinity of and perpendicularly with respect to the optical axis of the lens to be tested and each situated in a plane normal to said axis, said pair of hairline means being situated forwardly of said lens-carrier means, a pair of support means respectively supporting said pair of hairline means for movement along said axis, a pair of manually operable adjusting means accessible at the region of the front end of said base means and operatively connected with said pair of support means for respectively adjusting the positions of said pair of hairline means along said axis one of said hairline means being selectively movable into position, in alignment with, forwardly of and rearwardly of, said other hairline means, and image-forming means carried by said base means rearwardly of said lens-carrier means and cooperating with said pair of hairline means and a lens to be tested to provide, in response to manipulation of said pair of adjusting means, sharp images of said pair of hairline means perpendicularly intersecting each other and visible to an operator situated adjacent said front end of said base means.

2. The combination of claim 1 wherein a third support means supports said pair of hairline means for movement in unison angularly about said axis, and third manually operable adjusting means operatively connected to said third support means for angularly turning said pair of hairline means about said axis, said third adjusting means also being accessible to an operator adjacent the front end of said base means.

3. The combination of claim 1 and wherein said image-forming means includes a screen facing the front end of said base means and an optical projection system for projecting onto said screen images of said pair of hairline means.

4. In a lens testing apparatus, a pair of mutually perpendicular hairline means for respectively measuring the spherical and cyindrical power of said lens and respectively situated in the immediate vicinity of a given axis wherein is disposed the lens to be tested with its optical axis coincident with said given axis and each being situated in a plane normal to said axis, and a pair of support means respectively supporting said pair of hairline means for movement along said axis, at least one of said support means supporting one of said hairline means for selective movement along said axis forwardly and rearwardly of said other hairline means from a position where said one hairline means is situated in a plane coincident with the plane in which the other of said hairline means is located.

5. The combination of claim 4 and wherein said one support means includes a pair of members carrying said one hairline means and situated at diametrically opposed locations with respect to said axis, said other support means including a pair of members carrying the other of said hairline means and situated at diametrically opposed locations with respect to said axis, said pair of members of said other support means defining between themselves spaces in which said pair of members of said one support means are freely movable for displacing said one hairline means past said other hairline means.

6. The combination of claim 5 and wherein all of said members respectively form elongated sections of a common cylinder and said cylinder sections which constitute said pair of members of said one support means slidably engaging the cylinder sections which constitute said pair of members of said other support means.

7. The combination of claim 6 wherein said one hairline means include an elongated filamentary member extending between and connected to the ends of said members of said one support means and the other of said hairline means including a pair of pins respectively carried by the members of the other of said support means, said pins having a common axis and terminating in free ends which define between themselves a space through which said one hairline means can pass.

8. The combination of claim 4 and wherein the other support means also supports said one support means for movement with respect to said other support means.

References Cited by the Examiner

UNITED STATES PATENTS 1,204,030  11/1916  Kellner _____ 88—56

FOREIGN PATENTS 874,119  8/1961  Great Britain.

JEWELL H. PEDERSEN, *Primary Examiner.*

JOHN K. CORBIN, *Examiner.*